United States Patent [19]
Niwa et al.

[11] Patent Number: 5,547,762
[45] Date of Patent: Aug. 20, 1996

[54] SANDWICH GLASSES

[75] Inventors: Hideyuki Niwa; Kiyomi Sasaki, both of Saitama-ken; Kyoei Yoshida, Tokyo; Itsuo Tanuma, Saitama-ken; Kazuo Naito, Kanagawa; Yasuhiro Morimura; Takahiko Koga, both of Tokyo, Japan

[73] Assignee: Bridgestone Corporation, Tokyo, Japan

[21] Appl. No.: 351,055

[22] Filed: Nov. 28, 1994

Related U.S. Application Data

[63] Continuation of Ser. No. 33,556, Mar. 18, 1993, abandoned.

[30] Foreign Application Priority Data

| Mar. 19, 1992 | [JP] | Japan | 4-063715 |
| Apr. 22, 1992 | [JP] | Japan | 4-102707 |
| Jun. 5, 1992 | [JP] | Japan | 4-145839 |

[51] Int. Cl.$^6$ ............. B32B 17/10; C03C 27/12
[52] U.S. Cl. .............. 428/442; 428/440; 428/441
[58] Field of Search .................. 428/440, 441, 428/442

[56] References Cited

U.S. PATENT DOCUMENTS

| 3,622,440 | 11/1971 | Snedeker et al. | 161/193 |
| 3,666,614 | 5/1972 | Snedecker et al. | 161/183 |
| 4,303,739 | 12/1981 | Beckmann et al. | 428/429 |
| 4,511,627 | 4/1985 | Tanuma et al. | 428/429 |
| 4,600,627 | 7/1986 | Honda et al. | 428/203 |
| 5,094,918 | 3/1992 | Niwa et al. | 428/440 |

FOREIGN PATENT DOCUMENTS

| 57-196747 | 12/1982 | Japan. |
| 3-183645 | 8/1991 | Japan. |

Primary Examiner—D. S. Nakarani
Attorney, Agent, or Firm—Sughrue, Mion, Zinn, Macpeak & Seas

[57] ABSTRACT

A sandwich glass is disclosed containing a thermoset resin layer interposed between glass plates, wherein the thermoset resin layer, prior to thermosetting, contains an uncured resin composition containing:

(a) an organic peroxide, (b) an ethylene-vinyl acetate copolymer, and (c) at least one compound selected from the group consisting of at least one acryloxy or methacryloxy group-containing compound and a hydrocarbon resin having a ratio of hydrogenation $\geq 91\%$;

wherein the at least one acryloxy or methacryloxy group-containing compound is selected from the group consisting of 1-methyl-1,3-dimethacryloxypropane, 2,2-dimethyl-1,3-diacryloxypropane, 2,2-dimethyl-1,3-dimethacryloxypropane, 2-hydroxy-1-acryloxy-3-methacryloxypropane, 2-hydroxy-1,3-dimethacryloxypropane, 1-hydroxy-2-methyl-1,3-diacryloxypropane and 1-hydroxy-2-methyl-1,3-dimethacryloxypropane and the ethylene-vinyl acetate copolymer contains vinyl acetate in an amount of 10–50% by weight. The sandwich glass of the present invention results in an improved resistance to yellowing and less perspective distortion.

20 Claims, 1 Drawing Sheet

SANDWICH GLASSES

This is a continuation of application Ser. No. 08/033,556 filed Mar. 18, 1993, now abandoned.

BACKGROUND OF THE INVENTION

1. Field of the Invention

The present invention relates to a sandwich glass for use in a front glass or a side glass of an automobile, a window glass of a building, and the like.

2. Description of the Related Art

In general, polyvinylbutyral resin has hitherto been mainly used as an intermediate layer for a sandwich glass. However, polyvinylbutyral resin is thermoplastic and, therefore, has the following drawbacks:

(1) Since polyvinylbutyral resin has a relatively low softening point, sliding of glass plates or formation of bubbles in the sandwich glass occurs due to heat after the glass plates are stuck to the resin;

(2) Since polyvinylbutyral resin is apt to be influenced by moisture, when the sandwich glass is left to stand in a high humidity atmosphere over a long period of time, the resin gradually whitens from the peripheral portion of the sandwich glass, and also the adhesion force of the resin to the glass plate is reduced; and (3) The impact fracture resistance of the sandwich glass depends upon temperature, and, in particular, the penetration resistance rapidly decreases in a temperature region exceeding room temperature, that is, at a temperature greater than or equal to approximately 30° C.

In order to solve the above drawbacks of polyvinylbutyral resin, the inventors have previously proposed a sandwich glass obtained by interposing a thermosetting resin comprised of ethylene-vinyl acetate copolymer and an organic copolymer between glass plates and then conducting the thermosetting of the resin (Japanese Patent Application Laid-Open No. 57-196747).

Further, as a method of improving the impact fracture resistance and the penetration resistance of the sandwich glass, sandwich glasses have been proposed in which a thermosetting resin is mixed with a hydrocarbon resin of 200–50,000 weight average molecular weight. Patent applications for such sandwich glasses have already been filed (e.g., Japanese Patent Application Laid-Open No. 3-183645).

However, considering safety as a great requirement of the sandwich glass, the impact resistance, penetration resistance, and transparency over a long period of time cannot be said to be sufficient under wide conditions even in the inventors' previous inventions.

Further, with regard to improving the perspective distortion of the aforementioned sandwich glass, when the sandwich glass is used as the front glass in a regular automobile, in order for the sandwich glass not to present any problems with regard to the visibility of the driver, the value thereof obtained by a perspective distortion test must be less than or equal to 1.0 min of arc. When the reading portion of a bar code reader is used as the glass portion, mistakes in reading are prevented at values less than or equal to 0.8 min of arc. Sandwich glasses having such values are required.

SUMMARY OF THE INVENTION

It is therefore an object of the present invention to provide novel sandwich glasses which improve the impact resistance, penetration resistance, and transparency as compared with the conventional sandwich glass and which are safe even when breakage is caused by an external force.

In order to achieve the above objects of the invention, the inventors have made various studies and found that the impact resistance, penetration resistance and transparency of the sandwich glass can be improved by providing a sandwich glass in which a thermosetting resin, in which an organic peroxide is mixed with an ethylene-vinyl acetate copolymer, is interposed between and integrated with glass plates, and a resin layer is thermoset. The thermosetting resin comprising at least one acryloxy or methacryloxy group-containing compound is expressed by the following general formula (I) and/or hydrocarbon resin having a ratio of hydrogenation of greater than or equal to 91%:

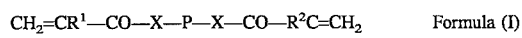

$$CH_2=CR^1-CO-X-P-X-CO-R^2C=CH_2 \qquad \text{Formula (I)}$$

Further, in accordance with another aspect of the invention, the variation in thickness of all portions of a thermosetting resin is set to less than or equal to 10 μm in order to improve the perspective distortion of the sandwich glass.

Namely, in order to improve the impact resistance, penetration resistance and transparency of the sandwich glass, the inventors of the present invention targeted an acryloxy or methacryloxy group-containing compound, which is a structural component of the thermosetting resin used in sandwich glasses for which the inventors have previously filed a patent application. As a result of their extensive studies, the inventors achieved the above-described objects and arrived at the present invention by using an acryloxy or methacryloxy group-containing compound having a specific molecular structure.

DETAILED DESCRIPTION OF THE INVENTION

Figure 1:
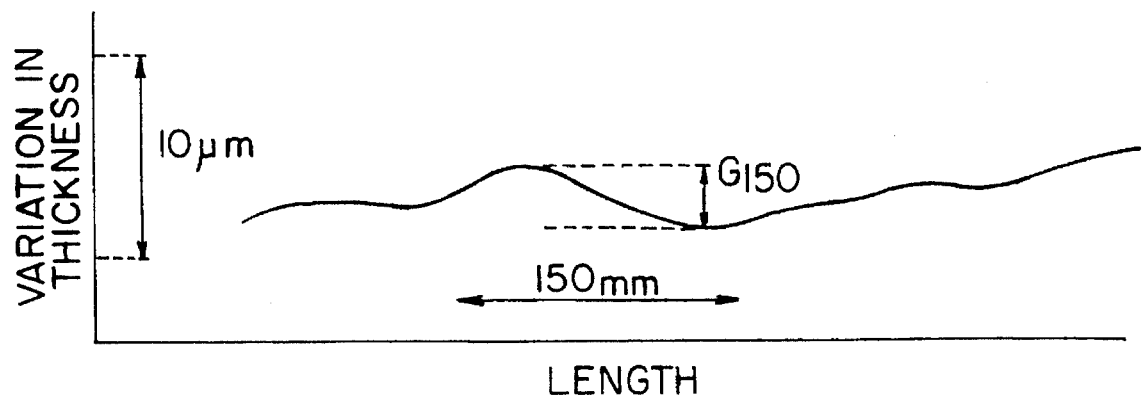
FIG. 1 is an explanatory view illustrating an example of variation in thickness with respect to a certain length of a resin sheet, wherein $G_{150}$ is conceptually represented.

In the present invention, at least one acryloxy or methacryloxy group-containing compound, expressed by general formula (I), is used.

In general formula (I), $R^1$ and $R^2$ represent a hydrogen atom or an alkyl group, and may either be different or the same. The alkyl group can be a methyl group, an ethyl group, a propyl group, a butyl group or the like. It is preferable that a hydrogen atom or a methyl group be used as $R^1$ and $R^2$, X represents an —O— bond or an —NH— bond. Considering general formula (I), the —O— bond represents an ester bond, and the —NH— bond represents an amide bond, but a regular —O— bond, i.e., an ester bond, is preferable.

In general formula (I), P is formed of —(CH$_2$)— bond units and/or —C(R$^3$)(R$^4$)— bond units. The number of bond units in P is 1–20, preferably 1–10, and even more preferably 1–5. The most preferable is 3–5. When the number of bond units exceeds 20, the reactivity of the ethylene-vinyl acetate copolymer undesirably weakens. When P is structured from both —(CH$_2$)— bond units and —C(R$^3$)(R$^4$)— bond units, the proportion of both units is not limited, but there are usually greater than or equal to 50% —(CH$_2$)— bond units. R$^3$ and R$^4$ represent a hydrogen atom, an alkyl group or a hydroxyl group, and may either be the same or different. Examples of the alkyl group include a methyl group, a propyl group, an isopropyl group, a butyl group, a t-butyl group and the like. It is preferable that R$^3$ is a methyl group or a hydroxyl group, and that R$^4$ is a hydrogen atom, a methyl group, of a hydroxyl group.

Examples of compounds represented by general formula (I) are diacryloxymethane, dimethacryloxymethane, dimethyl diacryloxymethane, dimethyl dimethacryloxymethane, hydroxymethyl diacryloxymethane, hydroxyethyl dimethacryloxymethane, 1,2-diacryloxyethane, 1,2-dimethacryloxyethane, 1-methyl-1,2-diacryloxyethane, 1-methyl-1,2-dimethacryloxymethane, 1-methyl-2-hydroxy-1,2-diacryloxyethane, 1-methyl-2-hydoroxy-1,2-dimethacryloxyethane, 1-methyl-2-hydroxy-1-acryloxy-2-methacryloxyethane, 1-methyl-1,3-dimethacryloxypropane, 2-methyl-1,3-dimethacryloxypropane, 1-methyl-1,3-diacryloxypropane, 2-methyl-1,3-diacryloxypropane, 1,1-dimethyl-1,3-diacryloxypropane, 1,1-dimethyl-1,3-dimethacryloxypropane, 1,1-dimethyl-1-acryloxy-3-methacryloxypropane, 1,2-dimethyl-1t,3-diacryloxypropane, 1,2-dimethyl-1,3-dimethacryloxypropane, 1,2-dimethyl-1-acryloxy-3-methacryloxypropane, 2,2-dimethyl-1,3-diacryloxypropane, 2,2-dimethyl-1,3-dimethacryloxypropane, 2,2-dimethyl-1-acryloxy-3-methacryloxypropane, 2-hydroxy-1,3-diacryloxypropane, 2-hydroxy-1,3-dimethacryloxypropane, 2-hydroxy-1,3-dimethacryloxypropane, 2-hydroxy-1-acryloxy-3-methacryloxypropane, 1,2-dihydroxy-1,3-diacryloxypropane, 1,2-dihydroxy-1,3-dimethacryloxypropane, 1,2-dihydroxy-1-acryloxy-3-methacryloxypropane, 1,2-dihydroxy-1-methacryloxy-3-acryloxypropane, 2,2-dihydroxy-1,3-diacryloxypropane, 2,2-dihydroxy-1,3-dimethacryloxypropane, 1,3-dihydroxy-1,3-diacryloxypropane, 1,3-dihydroxy-1,3-dimethacryloxypropane, 1,2,3-trihydroxy-1,3-diacryloxypropane, 1,2,3-trihydroxy-1,3-dimethacryloxypropane, 1-hydroxy-2-methyl-1,3-diacryloxypropane, 1-hydroxy-2-methyl-1,3-dimethacryloxypropane, 1,2-dihydroxy-3-methyl-1,3-diacryloxypropane, 1,2-dihydroxy-3-methyl-1,3-dimethacryloxypropane, 1-hydroxy-2,3-dimethyl-1,3-diacryloxypropane, 1-hydroxy-2,3-dimethyl-1,3-dimethacryloxypropane, 2-hydroxy-1,3-dimethyl-1,3-diacryloxypropane, 2-hydroxy-1,3-dimethyl-1,3-dimethacryloxypropane, 1,2,3-trimethyl-1,3-diacryloxypropane, 1,2,3-trimethyl-1,3-dimethacryloxypropane, 1-methyl-1,4-diacryloxybutane, 1-methyl-1,4-dimethacryloxybutane, 2-methyl-1,4-diacryloxybutane, 2-methyl-1,4-dimethacryloxybutane, 1,3-dimethyl-1,4-diacryloxybutane, 1,3-dimethyl-1,4-dimethacryloxybutane, 2,3-dimethyl-1,4-diacryloxybutane, 2,3-dimethyl-1,4-dimethacryloxybutane, 2,2-dimethyl-1,4-diacryloxybutane, 2,2-dimethyl-1,4-dimethacryloxybutane, 1,1-dimethyl-1,4-diacryloxybutane, 1,1-dimethyl-1,4-dimethacryloxybutane, 1-hydroxy-1,4-diacryloxybutane, 1-hydroxy-1,4-dimethacryloxybutane, 2-hydroxy-1,4-diacryloxybutane, 2-hydroxy-1,4-dimethacryloxybutane, 1,3-dihydroxy-1,4-diacryloxybutane, 1,3-dihydroxy-1,4-dimethacryloxybutane, 2,3-dihydroxy-1,4-diacryloxybutane, 2,3-dihydroxy-1,4-dimethacryloxybutane, 2,2-dihydroxy-1,4-diacryloxybutane, 2,2-dihydroxy-1,4-dimethacryloxybutane, 1,1-dihydroxy-1,4-diacryloxybutane, 1,1-dihydroxy-1,4-dimethacryloxybutane, 1-hydroxy-2-methyl-1,4-diacryloxybutane, 1-hydroxy-2-methyl-1,4-dimethacryloxybutane, 2-hydroxy-3-methyl-1,4-diacryloxybutane, 2-hydroxy-3-methyl-1,4-dimethacryloxybutane, 1-hydroxy-3-methyl-1,4-diacryloxybutane, 1-hydroxy-3-methyl-1,4-dimethacryloxybutane, 1-hydroxy-2,2-dimethyl-1,4-diacryloxybutane, 1-hydroxy-2,2-dimethyl-1,4-dimetharyloxybutane, 1-hydroxy-2,3-dimethyl-1,4-diacryloxybutane, 1-hydroxy-2,3-dimethyl-1,4-dimethacryloxybutane, 1-methyl-2-hydroxy-1,4-diacryloxybutane, 1-methyl-2-hydroxy-1,4-dimethacryloxybutane, 1-methyl-2,3-dihydroxy-1,4-diacryloxybutane, 1-methyl-2,3-dihydroxy-1,4-dimethacryloxybutane, 2,2-dimethyl-1,5-diacryloxypentane, 2,2-dimethyl-1,5-dimethacryloxypentane, 3,3-dimethyl-1,5-diacryloxypentane, 3,3-dimethyl-1,5-dimethacryloxypentane, 2-hydroxy-1,5-diacryloxypentane, 2-hydroxy-1,5-dimethacryloxypentane.

Preferable compounds include: 1-methyl-1,3-dimethacryloxypropane, 2,2-dimethyl-1,3-diacryloxypropane, 2,2-dimethyl-1,3-diacryloxypropane, 2,2-dimethyl-1,3-dimethacryloxypropane, 2-hydroxy-1-acryloxy-3-methacryloxypropane, 2-hydroxy-1,3-dimethacryloxypropane, 1-hydroxy-2-methyl-1,3-diacryloxypropane, 1-hydroxy-2-methyl-1,3-dimethacryloxypropane.

According to the invention, an acryloxy or methacryloxy group-containing compound selected from derivatives of acrylic and methacrylic acids, or a vinyl or allyl group-containing compound may be added as a curing assistant to the resin composition in an amount of 0.1 to 50% by weight per ethylene-vinyl acetate copolymer.

Further, with regard to the hydrocarbon resin used in the present invention, the number of double bonds is kept to the minimum possible. Namely, the hydrocarbon resin used in the present invention is a hydrocarbon resin having a high ratio of hydrogenation (ratio of adding hydrogen).

The hydrocarbon resin used in the present invention has a ratio of hydrogenation of greater than or equal to 91%, preferably greater than or equal to 95%. The ratio of hydrogenation represents the proportion of double bonds before the hydrogenating reaction occurs which is saturated after the hydrogenating reaction. The ratio of hydrogenation can be made a fixed amount as an iodine number by an absorption ratio of iodine.

Hydrocarbon resins used in the invention include any one of natural resins and synthetic resins. As the natural resin, rosin, rosin derivatives and terpene resins are favorably used. As the rosin, use may be made of gum resin, tall oil resin, wood resin and the like. As the rosin derivative, use may be made of hydrogenated rosin, disproportionated rosin, rosin polymer, rosin ester and metal salt of rosin. As the terpene resin, use may be made of terpene resins such as α-pinene, β-pinene and the like as well as terpene phenol resin. Furthermore, dammar, copal and shellac may be used as the natural resin.

On the other hand, petroleum resins, phenolic resins and xylene resins are favorably used as the synthetic resin. As petroleum resin, use may be made of aliphatic petroleum resin, aromatic petroleum resin, alicyclic petroleum resin, copolymeric petroleum resin, hydrogenated petroleum resin, pure monomeric petroleum resin and cumarone indene resin. As the phenolic resin, use may be made of alkyl phenol resins, modified phenolic resins and the like. As the xylene resin, use may be made of xylene resin and modified xylene resins.

According to the invention, the amount of the hydrocarbon resin added to the ethylene-vinyl acetate copolymer is 1–100 parts by weight, preferably, 2–80 parts by weight.

The hydrocarbon resin used in the invention has a weight average molecular weight of 200–50,000, preferably, 200–10,000.

The sandwich glass including the above-described hydrocarbon resin adds impact resistance, penetration resistance, transparency, and exhibits a superior performance without yellowing even if used over a long period of time.

Further, in a second aspect of the present invention, in order to improve perspective distortion, the variation in thickness of the resin sheet is stipulated. Namely, it is preferable that the variation in thickness of all portions of the resin sheet is less than or equal to 10 μm. When the variation in thickness is greater than 10 μm, the perspective distortion of the sandwich glass becomes greater. If the aforementioned desired standards with respect to perspective distortion are not satisfied, the perspective distortion becomes a hindrance when the sandwich glass is put into use.

As an easy way of measuring the variation in thickness, variations in thickness are measured over a length of 150 mm in several arbitrary regions and in an arbitrary direction. The largest value of the variations in thickness is represented by $G_{150}$. FIG. 1 illustrates an example of variation in thickness with respect to a certain length in an arbitrary region and in an arbitrary direction. It can be seen that $G_{150}$ is generally kept to less than 10 μm. FIG. 1 is an explanatory view in which the meaning of $G_{150}$ can be understood.

The configuration of the resin sheet in the present invention is not limited, but usually, a continuous sheet having a width is used. Further, the width can be made to any width in accordance with the facilities which produce the resin sheet. In this case, it is necessary that the variation in thickness in the direction of the width over the entire width is less than or equal to 10 μm. If the variation in thickness exceeds 10 μm, as described above, the perspective distortion undesirably becomes larger.

In the measuring of the variation in thickness in the widthwise direction, the variation in thickness can be easily controlled because the measuring direction is decided upon. Therefore, a resin sheet having a standardized thickness quality can be obtained stably. As a result, a sandwich glass having little perspective distortion can be stably produced, which is very important when the sandwich glass is put into use.

Figure 2:
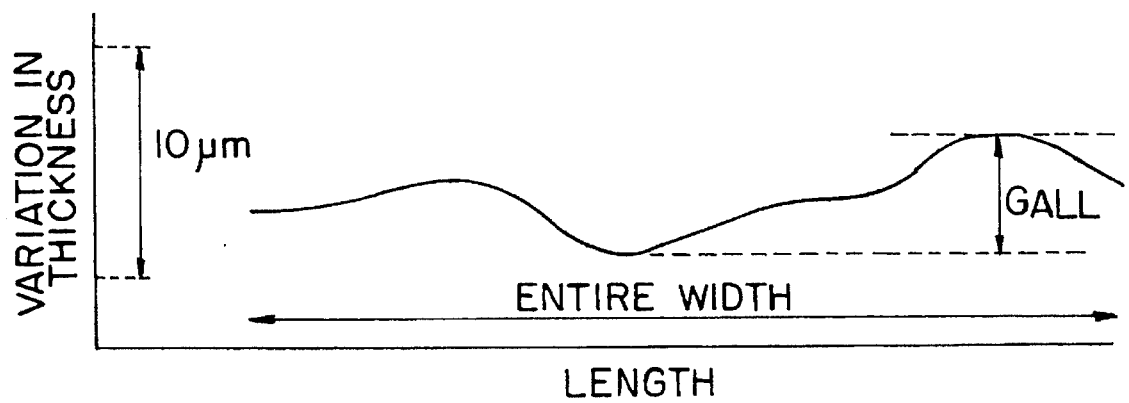
FIG. 2 is an explanatory view illustrating an example of variation in thickness with respect to an entire length of the resin sheet wherein $G_{ALL}$ is conceptually represented.

In the method of measuring the variation in thickness in the widthwise direction, the variations in thickness of the entire width are measured in the resulting resin sheet by measuring a plurality of different regions. The maximum value of the variations in thickness is represented by $G_{ALL}$. FIG. 2 illustrates an example of variation in thickness with respect to the entire length in an arbitrary region and in the direction of the width of the resin sheet having a width. It can be seen that $G_{ALL}$ is generally kept to less than 10 μm. FIG. 2 is an explanatory view in which the meaning of $G_{ALL}$ can be understood.

Further, it is preferable that the thickness of the resin sheet interposed between the glass plates is 0.1 mm to 1.5 mm. This value changes according to the thickness of the glass and the purpose thereof.

Any method may be used for manufacturing the resin sheet of the present invention provided that the method allows for the variation in thickness to be less than or equal to 10 μm. As a specific example of such, a method the configuration of the sheet is molded after the viscosity of the resin material, which is used as the main material in the resin sheet, is adjusted to an MFR (melt flow rate, i.e., the flow rate of the resin at 190° C.) of less than or equal to 50 g/10 min. It is more preferable that the MFR is less than or equal to 10 g/10 min.

In the ethylene-vinyl acetate copolymer used in the invention, the content of vinyl acetate is 10–50% by weight, preferably, 15–40% by weight. When the vinyl acetate content is less than 10% by weight, the transparency becomes insufficient during crosslinking and curing at high temperature. When the vinyl acetate content exceeds 50% by weight, the impact resistance and penetration resistance of the resulting sandwich glass become poor.

In the production of the sandwich glass according to the invention, the organic peroxide is used as a curing agent for the ethylene-vinyl acetate copolymer. Any peroxides creating radicals by decomposition at a temperature of not lower than 100° C. can be used. Considering the safeness in the mixing, organic peroxides having a 10 hour half-value period decomposition temperature of not lower than 70° C. are preferably used. Examples of such include 2,5-dimethylhexane-2,5-dihydroperoxide, 2,5-dimethyl-2,5-di(t-butylperoxy)hexane-3, di-t-butyl peroxide, t-butylcumyl peroxide, 2,5-dimethyl-2,5-di(t-butylperoxy)hexane, dicumyl peroxide, α,α'-bis(t-butylperoxyisopropyl)benzene, n-propyl-4,4'-bis(t-butylperoxy)valerate, 2,2-bis(t-butylperoxy)butane, 1,1-bis(t-butylperoxy)cyclohexane, 1,1-bis(t-butylperoxy)-3,3,5-trimethyl cyclohexane, t-butylperoxy benzoate, benzoyl peroxide and the like. As the organic peroxide, at least one of the above peroxides is used in an amount of 0.1 to 5 parts by weight based on 100 parts by weight of ethylene-vinyl acetate copolymer.

According to the invention, a silane coupling agent may be added for further improving the adhesion force between ethylene-vinyl acetate copolymer and the glass plates. As the silane coupling agent used for this purpose, examples include well-known ones such as γ-chloropropylmethoxy silane, vinyltrichloro silane, vinyltriethoxy silane, vinyltris(β-methoxyethoxy)silane, γ-methacryloxypropyl trimethoxy silane, β-(3,4-ethoxycyclohexyl)ethyl-trimethoxy silane, γ-glycidoxypropyl trimethoxy silane, vinyltriacetoxy silane, γ-mercaptopropyl trimethoxy silane, γ-aminopropyl triethoxy silane, N-γ-(aminoethyl)-γ-aminopropyl trimethoxy silane and the like. It is sufficient that the amount of the above silane coupling agent added is 5 parts by weight or less.

If necessary, a polymerization retarder such as hydroquinone, hydroquinone monomethyl ether, p-benzoquinone, methylhydroquinone or the like may be added in an amount of 0.1–5 parts by weight for improving the safeness. Further, a coloring agent, an ultraviolet ray absorbing agent, an antioxidant, a discoloration preventive agent and the like may be added.

Further, in the present invention, besides the specific acryloxy group-containing compound and methacryloxy-group containing compound expressed in general formula (I), an acryloxy group-containing compound, a methacryloxy group-containing compound or an allyl group-containing compound may be added as a curing aid for enhancing initial modulus of the ethylene-vinyl acetate copolymer in order to improve penetration resistance. As the compound used for this purpose, use may be made of derivatives of acrylic acid and methacrylic acid such as esters thereof and so on.

As an alcohol residue of the ester, mention may be made of alkyl groups such as methyl group, ethyl group, dodecyl group, stearyl group, lauryl group and the like, as well as cyclohexyl group, tetrahydrofurfuryl group, aminoethyl group, 2-hydroxyethyl group, 3-hydroxypropyl group, 3-chloro-2-hydroxypropyl group and so on. Further, esters with a polyfunctional alcohol such as ethylene glycol, triethylene glycol, polyethylene glycol or the like may be used.

As the allyl group-containing compound, diallyl phthalate, diallyl fumalate, diallyl maleate, triallyl isocyanurate, triallyl cyanurate and the like are preferably used.

Further, the amount of such a compound is 0.1–50% by weight to the ethylene-vinyl acetate copolymer.

Moreover, in order to improve the storage stability, not more than 5% by weight of a polymerization inhibitor such as hydroquinone, hydroquinone monomethyl ether, p-benzoquinone, methylhydroquinone or the like may be added to the resin composition. In addition to the above-described additives, colorant, ultraviolet absorbing agent, stabilizer, discoloration-preventing agent and the like may be optionally added to the resin composition in accordance with use purposes.

The manufacture of sandwich glass using the ethylene-vinyl acetate resin composition can be performed in the same manner as in the manufacture of sandwich glass using the conventional plasticized polyvinylbutyral resin. That is, the resin composition is thoroughly kneaded by means of a roll mill or the like and then shaped into a sheet using an extruder, a calender, an inflation die, a hot press or the like. The resulting sheet is interposed between two glass plates to be superposed and gradually heated up to approximately 80° C. while passing through several sets of rolls, during which the sheet is softened and adhered tightly to the glass plates while expelling air existent between the sheet and the glass plates by increasing the pressure between the rolls. Then, the resulting glass assembly provided with the uncured resin intermediate layer is heated on a hot plate, whereby the intermediate layer is crosslinked to provide a sandwich glass having a completely transparent intermediate layer. In this case, any heating means usually used in the industry such as hot air, oven, autoclave, infrared or far infrared ray irradiation, dielectric heat and the like may be used.

As mentioned above, according to the invention, there can be provided sandwich glasses having excellent impact resistance, penetration resistance, and transparency for use in the front glass and the side glass of an automobile, the window glass of a building or the like. The sandwich glass is safe even when the breakage thereof is caused due to an external force.

The following examples are given in illustration of the invention and are not intended as limitations thereof.

The ethylene-vinyl acetate copolymer, the impact test and the transparency test are as follows.
Ethylene-vinyl acetate copolymer:
vinyl acetate content=25 wt %
Impact Test:
In accordance with JIS R3025 (1983), a steel ball was dropped from a height of 120 cm, and the conditions of cracks produced by the impact (an index of the impact resistance) were measured.
Transparency Test:
A haze maker produced by Suga Shikenki Co., Ltd. was used, and the haze value (an index of the transparency) was measured.

FIRST EXAMPLE 1-methyl-1,3-dimethacryloxypropane was used, and each component was mixed in the proportions shown in Table 1. The composition was kneaded by a roll mill, heated to 80° C., and the resin was produced. The resulting thermoplastic resin was pressed so that a 0.76 mm thick sheet was formed. This resin sheet was interposed between two front glasses, each 3 mm thick, which had been washed and dried in advance. Thereafter, the front glasses with the resin sheet interposed therebetween were inserted into a rubber bag, a vacuum was created, and preliminary crimping was conducted at a temperature of 80° C. Next, the sandwich glass, which had been subject to preliminary crimping, was inserted into an oven and was processed for 30 minutes at 130° C.

As can be seen from the results of Table 1, the impact resistance of the sandwich glass was outstanding in the impact test. Further, the transparency was high, as can be seen by studying the haze value, and there was no optical distortion.

TABLE 1

|  | Example 1 | Example 2 | Example 3 | Example 4 | Comparative Example 1 |
|---|---|---|---|---|---|
| Contents (Propostion by weight) | | | | | |
| Urutorasen 635 | 100 | 100 | 100 | 100 | 100 |
| 1-methyl-1,3-dimethacryloxypropane | 5 | 20 | — | — | — |
| 1,2-dimethyl-1,3-dimethacryloxypropane | — | — | 5 | — | — |
| 2-hydroxy-1,3-dimethacryloxypropane | — | — | — | 5 | — |
| triallylisocyanurate | — | — | — | — | 5 |
| γ-methacryloxypropyl trimethoxysilane | 0.5 | 0.5 | 0.5 | 0.5 | 0.5 |
| 1,1-bis(t-buthyl-peroxy)-3,3,5-trimethyl cyclohexane | 2 | 2 | 2 | 2 | 2 |
| Results | | | | | |
| Impact Test (Drop height 120 cm) | no cracks | no cracks | no cracks | no cracks | cracks formed (length 80 mm) |
| Transparency Test Haze value (%) | 0.6 | 0.8 | 0.6 | 0.6 | 0.6 |

SECOND THROUGH FOURTH EXAMPLES

The second through fourth examples were conducted in the same way as the first example with the following exceptions: in the second example, 20 parts by weight of 1-methyl-1,3-dimethacryloxypropane was used, and in the third and fourth embodiments, instead of 1-methyl-1,3-dimethacryloxypropane, 5 parts by weight of 2,2-dimethyl-1,3-dimethacryloxypropane and 5 parts by weight of 2-hydroxy-1,3-dimethacryloxypropane were used, respectively. As illustrated in Table 1, in the impact test, no cracks were formed in four samples which were tested. Further, the haze value was 0.8. Namely, the examples of the present invention are superior in both impact resistance and transparency.

Comparative Example 1

Table 1 also illustrates comparative example 1 which is the same as the first example, with the exception that 5 parts by weight of triallylisocyanurate was mixed instead of 1-methyl-1,3-dimethacryloxypropane. As can be seen from the results in Table 1, in the impact test, the average length of the opening portion of the cracks formed in the four samples of comparative example 1 was 80 mm, and the haze value was 0.6. The results shown in Table 1 therefore illustrate that the sandwich glass of the comparative example is inferior in impact resistance compared to the examples of the present invention. This shows that the sandwich glass of the comparative example, in which a three functional group compound such as triallylisocyanurate is used, is inferior in impact resistance to the present invention in which a two functional group compound having functional groups at both ends, such as 1-methyl-1,3-dimethacryloxypropane is used.

FIFTH EXAMPLE

The ethylene-vinyl acetate copolymer and the hydrocarbon resin used are as described below.
Ethylene-vinyl acetate copolymer:
  "Urutorasen 634" (manufactured by Toso Co., Ltd. (trade name))
  vinyl acetate content=26 wt %
Hydrocarbon Resin:
  Example:
  "Alcon F-100" (Arakawa Kagaku Kogyo Co., Ltd. (trade name))
  ratio of hydrogenation 98%; weight average molecular weight 700 alicyclic group hydrocarbon resin
  Comparative Example:
  "Alcon M-100" (Arakawa Kagaku Kogyo Co., Ltd. (trade name))
  ratio of hydrogenation 90%; weight average molecular weight 700 alicyclic group hydrocarbon resin Using Alcon P-100, each component was mixed in the proportions shown in Table 2. The composition was kneaded by a roll mill heated to 80° C., and the resin was produced.

TABLE 2

| | Example 5 | Comparative Example 2 |
|---|---|---|
| Contents (Propostion by weight) | | |
| Urutorasen 635 | 100 | 100 |
| Alcon P-100 | 30 | — |
| Alcon M-100 | — | 30 |
| triallylisocyanurate | 2 | 2 |
| γ-methacryloxypropyl trimethoxysilane | 0.5 | 0.5 |
| 1,1-bis(t-buthyl-peroxy)-3,3,5-trimethyl cyclohexane | 2 | 2 |
| 2,2-dihydroxy-4,4'-dimethoxy benzophenone | 0.15 | 0.15 |
| bis(2,2,6,6-tetramethyl-4-piperidyl) sebacate | 0.3 | 0.3 |
| 1-{2-[3-(3,5-di-t-buthyl-4-hydroxyphenyl)propionyloxy]ethyl}-4-[3-(3,5-di-t-buthyl 4-hydroxyphenyl)propionyloxy]-2,2,6,6-tetramethylpiperidine | 0.3 | 0.3 |
| Results | | |
| Yellowing Resistance | no yellowing | yellowing was detected |

A press was used so that a 0.76 thick sheet was formed from the resulting thermoplastic resin. This resin sheet was interposed between two front glasses, each 3 mm thick, which had been washed and dried in advance. Thereafter, the front glasses with the resin sheet interposed therebetween were inserted into a rubber bag, a vacuum was created, and preliminary crimping was conducted at a temperature of 80° C. Next, the sandwich glass, which had been subject to preliminary crimping, was inserted into an oven, and was processed for 30 minutes at 130° C. The transparency of the resulting sandwich glass was high, and there was no optical distortion. Further, the impact resistance and penetration resistance were superior.

This sandwich glass was subject to an accelerated exposure test for 300 hours using the Super UV Tester (SUV-F Type 1) by Iwasaki Denki Co., Ltd. The sandwich glass after the test showed no variation as compared to the sandwich glass before the test. The test demonstrated that the yellowing resistance of this sandwich glass is extremely excellent.

Comparative Example 2

Comparative example 2 was the same as the example 5, with the exception that Alcon M-100 was used instead of Alcon P-100. When the sandwich glass after the exposure test was compared to the sandwich glass before the exposure test, conspicuous yellowing was detected.

SIXTH EXAMPLE

A thermosetting resin consisting of 100 parts by weight of ethylene-vinyl acetate copolymer (vinyl acetate content: 26 wt %, MFR: 4.0), 2 parts by weight of organic peroxide (dicumyl peroxide), was formed to a thickness of 0.4 mm and a width of 1000 mm by using a precise roll. The maximum value ($G_{150}$) of variation in a length of 150 mm of the resin sheet was 5 μm, and the maximum value ($G_{ALL}$) of variation in thickness of the entire width was 6 μm.

The aforementioned resin sheet was interposed between glass plates having respective thicknesses of 3 mm. The resin sheet and the glass plates were inserted as a laminated body into a rubber bag (which was deaerated) and heated for 30 minutes at 90° C. Thereafter, the laminated body was removed from the rubber bag, and was heated for 20 minutes at 150° C. so that the sandwich glass was obtained. The perspective distortion caused by this sandwich glass was measured in accordance with the perception distortion test (JIS R3212 (1985)). The results thereof are illustrated in Table 3. This sandwich glass exhibited no problems in the characteristics, including impact fracture resistance, penetration resistance, and the like.

TABLE 3

|  | Example 6 | Comparative Example 3 | Comparative Example 4 |
|---|---|---|---|
| Resin sheets |  |  |  |
| thickness (mm) | 0.4 | 0.4 | 0.4 |
| width (mm) | 1000 | 1000 | 1000 |
| Variation in thickness |  |  |  |
| $G_{150}$ (μm) | 5 | 12 | 15 |
| $G_{ALL}$ (μm) | 6 | 15 | 20 |
| Perspective distortion of sandwich glasses (min. of arc) | 0.5 | 1.3 | 1.8 |

Comparative Example 3

Using an ethylene-vinyl acetate copolymer with an MFR of 100, a resin sheet such as that of the first example and a sandwich glass such as that of the second example were produced. For the resulting resin sheet, $G_{150}$ was 8 μm, and $G_{ALL}$ was 15 μm. The results are illustrated in Table 3.

Comparative Example 4

Using an ethylene-vinyl acetate copolymer with an MFR of 400, a resin sheet such as that of the first example and a sandwich glass such as that of the second example were produced. For the resulting resin sheet, $G_{150}$ was 15 μm, and $G_{ALL}$ was 20 μm. The results are illustrated in Table 3.

As shown in Table 3, in the example of the present invention, a resin sheet having a variation in thickness of less than 10 μm was obtained. Using this resin sheet, the perspective distortion was 0.5 min of arc, which clears the required standards and illustrates that a superior sandwich glass was obtained. As can be seen from the results in Table 3, when a resin sheet having a large variation in thickness is used, the perspective distortion is very marked.

What is claimed is:

1. A sandwich glass comprising a thermoset resin layer interposed between glass plates, wherein said thermoset resin layer, prior to thermosetting, comprises an uncured resin composition comprising:
   (a) an organic peroxide,
   (b) an ethylene-vinyl acetate copolymer, and
   (c) at least one compound selected from the group consisting of at least one acryloxy or methacryloxy group-containing compound and a hydrocarbon resin having a ratio of hydrogenation ≧91%;
wherein said at least one acryloxy or methacryloxy group-containing compound is selected from the group consisting of 1-methyl-1,3-dimethacryloxypropane, 2,2-dimethyl-1,3-diacryloxypropane, 2,2-dimethyl-1,3-dimethacryloxypropane, 2-hydroxy-1-acryloxy-3-methacryloxypropane, 2-hydroxy-1,3-dimethacryloxypropane, 1-hydroxy-2-methyl-1,3-diacryloxypropane and 1-hydroxy-2-methyl-1,3-dimethacryloxypropane; and
   wherein said ethylene-vinyl acetate copolymer contains vinyl acetate in an amount of from 10–50% by weight.

2. The sandwich glass as in claim 1, wherein said at least one acryloxy or methacryloxy group-containing compound is present in an amount of 0.1–50 parts by weight per 100 parts by weight of said ethylene-vinyl acetate copolymer.

3. The sandwich glass as in claim 2, wherein said organic peroxide is present in an amount of 0.1–1.5 parts by weight per 100 parts by weight of said ethylene-vinyl acetate copolymer.

4. The sandwich glass as in claim 2, wherein said thermoset resin layer further comprises a silane coupling agent.

5. The sandwich glass as in claim 2, wherein said ethylene-vinyl acetate copolymer contains vinyl acetate in an amount of from 15–40% by weight.

6. The sandwich glass as in claim 1, wherein said hydrocarbon resin is present in an amount of 1–100 parts by weight per 100 parts by weight of said ethylene-vinyl acetate copolymer.

7. The sandwich glass as in claim 6, wherein said organic peroxide is present in an amount of 0.1–1.5 parts by weight per 100 parts by weight of said ethylene-vinyl acetate copolymer.

8. The sandwich glass as in claim 6, wherein said hydrocarbon resin has a weight average molecular weight of 200–50,000.

9. The sandwich glass as in claim 8, wherein said organic peroxide is present in an amount of 0.1–1.5 parts by weight per 100 parts by weight of said ethylene-vinyl acetate copolymer.

10. The sandwich glass as in claim 6, wherein said ratio of hydrogenation is ≧95%.

11. The sandwich glass as in claim 1, wherein said hydrocarbon resin has a weight average molecular weight of 200–50,000.

12. The sandwich glass as in claim 11, wherein said organic peroxide is present in an amount of 0.1–1.5 parts by weight per 100 parts by weight of said ethylene-vinyl acetate copolymer.

13. The sandwich glass as in claim 1, wherein said ratio of hydrogenation is ≧95%.

14. The sandwich glass as in claim 1, wherein said organic peroxide is present in an amount of 0.1–1.5 parts by weight per 100 parts by weight of said ethylene-vinyl acetate copolymer.

15. The sandwich glass as in claim 1, wherein said thermoset resin layer further comprises a silane coupling agent.

16. The sandwich glass as in claim 1, wherein said ethylene-vinyl acetate copolymer contains vinyl acetate in an amount of from 15–40% by weight.

17. A sandwich glass comprising a thermoset resin layer interposed between glass plates, wherein said thermoset resin layer, prior to thermosetting, has a variation in thickness of ≦10 μm and comprises an uncured resin composition comprising:
   (a) an organic peroxide, and
   (b) an ethylene-vinyl acetate copolymer; and said ethylene-vinyl acetate copolymer contains vinyl acetate in an amount of from 10–50% by weight.

18. The sandwich glass as in claim 17, wherein said organic peroxide is present in an amount of 0.1–1.5 parts by weight per 100 parts by weight of said ethylene-vinyl acetate copolymer.

19. The sandwich glass as in claim 17, wherein said thermoset resin layer further comprises a silane coupling agent.

20. The sandwich glass as in claim 17, wherein said ethylene-vinyl acetate copolymer contains vinyl acetate in an amount of from 15–40% by weight.

* * * * *